Patented Nov. 3, 1936

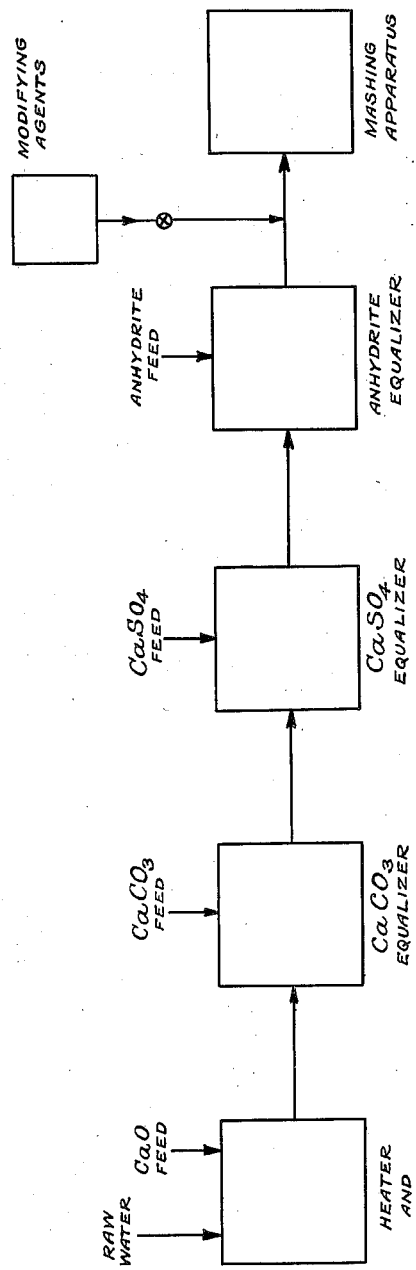

2,059,645

UNITED STATES PATENT OFFICE 2,059,645

STANDARDIZING WATER FOR MASHING PROCESSES

Karl P. McElroy, Washington, D. C.

Application April 18, 1933, Serial No. 666,725

12 Claims. (Cl. 99—50)

This invention relates to standardizing water for mashing processes; and it comprises an improvement in manufacturing sound and satisfactory beer, etc., from malt, or from malt in admixture with unmalted grain, wherein mashing and sparging are effected with a reconstituted and standardized natural water having an equilibrated calcium content including calcium sulfate, said natural water being heated or boiled for sterilization and for removal of some $CO_2$, the hot water being thereafter brought into intimate contact with granular calcium carbonate, said carbonate being of dolomitic origin where magnesia is desired to take part in the equilibrium, the hot water being thereafter brought into intimate contact with calcium sulfate and being finally used in mashing and sparging; all as more fully hereinafter set forth and as claimed.

Brewing, that is the production of fermented beverages from cereals, is an old and, largely, empirical art where great attention to details is necessary in making sound and satisfactory beer. Most of the difficulties arise in producing a fermentable decoction, or "wort" from the cereals; an operation known as mashing. It has long been known that the nature of the water is of great importance; the character of available water being influential in locating breweries. And water from deep wells is mostly used to minimize fluctuations in the quality of the water. All the dissolved constituents of natural water used in brewing are important; this being particularly true of the mineral matter. The routine in mashing is largely controlled by the character of the water; and it is for this reason that fluctuations in quality are annoying and expensive.

In mashing, malt, with or without unmalted grain, is mixed with hot water and the mixture is kept at some temperature around 60° C. until saccharification is complete. A temperature of this order is necessary to suppress bacterial action. Mashing gives a wort. The wort is brought to a boil to coagulate albumenoids and stop all actions. Finally, the boiled wort is drawn off. Hops are added to the boiled wort and boiling continued for a time. The residue of "grains" left in mashing and the hop residues are washed with a further supply of water; an operation known as sparging. The wort diluted with the water used in sparging is then rapidly chilled and goes to the fermenter.

Using some waters, in boiling the wort a coagulum separates in coarse, flocculent form, leaving a clear, bright liquid. In such cases, mere filtration through the residue of grains and hops is sufficient to give a bright, clear wort. With other waters, the coagulum formed in the boiling is of fine character; the boiled wort may carry a fine gray turbidity difficult to obviate by filtration. Often, special treatments to produce a bright wort are required and this is inconvenient. Obtaining a clear, boiled, hopped wort is highly desirable in making sound beer. Water giving turbid worts are bad for brewing purposes, but they occur rather frequently. Waters giving bright, thoroughly satisfactory worts are somewhat rare. Waters of intermediate character are much more common than either of these extremes. They give a coagulum which can be satisfactorily removed, albeit, with more or less trouble. The pH value at this time is important.

As a rule, hard natural waters owing their hardness to dissolved lime compounds give better results in this boiling operation than waters not containing lime. Hard water is better than soft water and water containing "permanent hardness" ($CaSO_4$) is better than water containing only "temporary hardness" ($CaCO_3$).

A major difficulty in all breweries is that the water supply fluctuates in composition; what is good practice in brewing one day may not be effective the next. Even with high quality water, from the brew master's view point, production of bright worts is apt to be erratic. Deep wells lessen the difficulty, but do not wholly obviate it. The operation is extremely sensitive to small variations in the character of the mineral matter present; and particularly as regards the calcium salts and the ratios between calcium carbonate and calcium sulfate.

In the present invention, I take natural waters of whatever character they may be and reduce them to a standardized constant condition as regards hardness. This obviates the effect of fluctuations in the quality of the raw water. In this standardized water I produce a standardized, equilibrated calcium content with most of the calcium present as calcium sulfate. In securing these ends, I first heat the water and free it from $CO_2$ as far as may be by boiling. If desired, an addition of milk of lime or lime water in the calculated amount may be made at this time; the amount of CaO added being somewhat less than corresponds to the free $CO_2$; the $CO_2$ holding calcium carbonate in solution as bicarbonate. Alkalinity of the water is not desired. The raw water used may, or may not, contain calcium carbonate or calcium sulfate, or both. Either soft water or hard water may be used in the present invention; either being brought to the same standardized degree of hardness. It is, broadly speaking, immaterial for my purposes whether it is deep water or surface water that is treated.

It is advantageous to keep the water at a boiling temperature for a substantial length of time with free opportunity for escape of vapors and gases. Lower temperatures, down to say 60° C., may be employed with exposure of a large area of surface, as in deaerators. This heat treatment is desirable in securing extrication of $CO_2$ and deposition of liberated $CaCO_3$, if any, in a form easily removed by filtration; and, incidentally, of attaining good sterilization. Open steam or closed steam may be used; but live steam is desirable; it is advantageous to blow in steam. Agitation by air can be used, but there is no particular advantage in it save in the case of some exceptional waters of a reducing character. Any commercial type of "deaerator" may be used; and particularly those types trickling hot water over shelves, etc. As stated, a small addition of lime at this time reduces the amount of $CO_2$ to be removed.

After this preliminary treatment the water is next methodically treated, first with calcium carbonate and then with calcium sulfate. Two forms of calcium sulfate may be desirable as explained hereinafter. As the actions are equilibrating actions, that of a solid with an aqueous solution in which the solubility is quite limited, it is desirable that the area of contact between liquid and solid be as great as convenient. The greater the area of contact the less time required. However, I customarily operate at about 100° C. in these equilibrations and this temperature quickens the actions. Generally, I use a series of filters through which the hot water passes; the first carrying calcium carbonate and a second, calcium sulfate. Any ordinary type of pervious bed filter can be employed. A pervious bed filter is a compact device for obtaining what is wanted: extended contact area between liquids and solids. Devices like upflow softeners with granulated matter in suspension can be used, but are not so compact. Where compactness and quick action are desirable, finely divided calcium carbonate or calcium sulfate, as the case may be, may be suspended in water and added to the passing water ahead of the filter. This enables use of fairly shallow filtering layers not imposing much frictional load on the water pressure.

Using filters, the first is composed of granulated hard marble. However, any clean, good grade limestone or dolomite is applicable; dolomite having a special utility in some relations. In use with very hard water, the filter soon picks up an accumulation of fine sedimentary calcium carbonate and its efficiency increases. With these waters, it is necessary however to remove some of the sediment from time to time. It is sometimes desirable to recycle some of this removed sediment, adding a little to ingoing water to serve as nuclei for the promotion of separation of calcium carbonate and to convert it into a quickly filtering form.

Where the trickling type of deaerator is used, it is advantageous to maintain granular calcium carbonate on the shelves, as it lessens the work subsequently required in the marble filter. Where dolomite is employed in the deaerator or in the filter, magnesium enters the equilibrium in the water; and this is sometimes desirable.

Whatever the initial composition of the hot water passed through the marble filter, after passage it is brought to a standardized content as regards calcium carbonate. If the raw water is poor in calcium carbonate, it picks up this substance from the filter. On the other hand, if the water is unduly rich in calcium carbonate, as is often the case with brewery waters, in boiling it deposits fine calcium carbonate and this, together with any excess of calcium carbonate which may remain in solution, is picked up in the marble filter. The filter has partly a filtering function, but it also offers nuclei to accelerate deposition of calcium carbonate.

The amount of calcium carbonate left in solution, after the boiling and filtration through a marble filter, is not great. In producing this type of water with a standardized calcium carbonate content, the use of a pervious bed filter is not necessary; but it is advantageous and gives a simpler operation. Other ways of bringing calcium carbonate in finely divided form into intimate contact with the water may be used; and in some cases, they are convenient for use with the water prior to passing a marble filter. Mechanical agitation, which is generally involved in these other methods, accelerates deposition of calcium carbonate coming out of solution.

The effluent hot water leaving the marble filter and saturated with calcium carbonate is now passed through a granular bed filter containing some form of calcium sulfate. Granulated native gypsum $CaSO_4.2H_2O$ is, on the whole, the best material for this filter but it is advantageous to have the final contact of the water occur with some form of native anhydrous $CaSO_4$; "anhydrite". This is for the reason that calcium sulfate solutions are apt to be supersaturated when made with hydrated forms of $CaSO_4$. For a similar reason, it is often advantageous to treat the water initially with some form of baked gypsum (plaster of Paris) to give a quicker action. Finely divided calcium sulfate suspended in water may be injected ahead of the filter. Two filters, in series, are advantageous; the first containing a reactive form of gypsum to produce quick action with calcium carbonate in solution, and the second containing anhydrite to produce reduction of supersaturation. The first of these filters requires changing oftener than the second, since it accumulates calcium carbonate. The supersaturated solutions are brought back to normal saturation by the influence of the anhydrite, which offers nuclei for crystallization.

As stated, in the calcium sulfate treatment, either one filter or a pair of filters may be employed. The choice depends on the type of filter used; the kind of calcium sulfate available and the work to be done. In general, using pervious bed filters of ordinary types, two filters in series are desirable. Calcium sulfate exists in a number of forms having different solubilities in water, the anhydrous form found in nature as "anhydrite" being the least soluble, while the dihydrate, $CaSO_4.2H_2O$, or gypsum, is considerably more soluble; the solubility, however, varying more or less with the specimen. Coarse gypsum is less soluble than fine. The most soluble form of calcium sulfate is the hemihydrate; ordinary plaster. All hydrated forms in water solution change into anhydrite at temperatures somewhere above 60° C. with deposition of crystals of anhydrite; but the transition is slow in the absence of preformed crystallized anhydrite to furnish nuclei for crystallization. By operating at 100° C. or thereabouts, the transformation is materially quickened.

By using two filters and two forms of calcium sulfate, advantage is taken of these peculiarities in the relation of CaSO₄ to water. By passing the hot water leaving the calcium carbonate filter first into contact with gypsum, or even with plaster of Paris, saturation with CaSO₄ is ensured. By then passing it into contact with anhydrite, the excess is removed, the amount left in solution being only that normal to the water at the particular temperature. By omitting the anhydrite filter, it is possible to deliver to the mash tun a water considerably richer in dissolved CaSO₄. The action is, however, less regulable; and it is generally better to secure exact adjustment of the water composition in the filters and, where more CaSO₄ is wanted, to add it to the effluent water as fine powdered gypsum or plaster.

In passing through the gypsum filter, the calcium content of the water is further equilibrated as between calcium carbonate and calcium sulfate. The water becomes saturated with CaSO₄ and CaCO₃ in equilibrium; the former being in excess. This is desirable in a good brew water.

At this time, the hot water leaving the final filter is of standardized quality and composition; it contains uniform amounts of calcium sulfate and of calcium carbonate and these bodies are present in a constant ratio. It forms a satisfactory water supply for mashing and sparging, with production of good wort, and the composition is constant.

Where the pH is to be adjusted, it can be done at this time; that is, by treatment of the hot water leaving the last filter in series. And at this time, any special substance desired for nutrition of yeast, etc., such as acid calcium phosphate, mono potassium phosphate, etc., can be added. These acid phosphates are compatible with the standardized water and may be used to change the pH toward the acid side. Other additions, such as magnesium sulfate, can be made to the standard water at this time, when they are wanted for special purposes. But, as stated, water produced as described and without additions is a good brewing water.

While I have described the various pervious beds as filters and they can exercise a filtering action, their main purpose is chemical and if filtration of the hot water is necessary or desirable, it is better done with a special sand filter. This is for the reason that the routine in handling filter beds is inconvenient with the pervious beds used in the present invention. In practice, I employ in series, means for boiling the water and keeping it at the boiling temperature for some time with free escape of vapors to carry off CO₂, a mechanical filter if this be needed, a marble filter and two gypsum filters, the first carrying some form of reactive hydrated calcium sulfate, while the second carries granulated anhydrite. Rather coarse granules are desirable in this last filter. From the last filter in series, the water, which is still hot, goes to storage means for supplying the mashing sparging apparatus. Mashing and sparging are performed in the usual way and with the usual means; the advantage of the present invention with regard to mashing being that the latter becomes uniform, whatever the variations or fluctuations in the raw water supply.

In the accompanying illustration, I have shown in the form of a flow sheet, certain combinations of apparatus elements, conventionally indicated; these combinations being within the purview of my invention and useful in the performance of the described process.

In this showing, raw water, which may be either soft or hard, goes to a conventionally shown boiling element or degasifier for extricating CO₂ and sterilizing. Boiling may be done with live steam. Any other means of heating may be employed. As indicated above, the trickling type of deaerator which may carry calcium carbonate on the shelves or be packed with lump marble, may be used in getting rid of CO₂. The extricated CO₂ and the accompanying steam are ordinarily sent to elements (not shown) for preheating incoming water. The degasifier may be provided with means for introducing a small amount of lime, thereby converting some of the CO₂ into suspended calcium carbonate.

From the degasifier, the hot water carrying more or less calcium carbonate in suspension goes into a second element which may be any commercial type of pervious bed filter provided with a charge of granular marble. In lieu of using a filter at this point, devices operating like upflow softeners may be used; granulated calcium carbonate being kept in suspension by an upflow of water. This accomplishes the object of extensive contact area between liquid and solid, but is not as compact as the pervious bed filter. Means are indicated for feeding finely divided calcium carbonate in aqueous suspension to this apparatus. This conveniently furnishes an extensive area of solid calcium carbonate; but it requires the use of a filter bed.

As indicated, the hot water from the calcium carbonate equalizer next flows in series through two calcium sulphate equalizers. In the first, dihydrated calcium sulphate in granular form (gypsum) is usually employed. The second is similarly charged with granular anhydrite. These two equalizers may be of any convenient type of apparatus giving a large area of contact surface between solid and liquid. It is however convenient to use both in the form of pervious bed filters. Sometimes a single filter can be used carrying superimposed layers of gypsum and of anhydrite. Using separate equalizers, much more rapid operation can be effected by introducing a little finely divided calcium sulphate in aqueous suspension. In the first equalizer this may be the dihydrated or the hemihydrated sulphate. The latter is, relatively speaking, extremely soluble. A feed of fine anhydrite may be used in the anhydrite equalizer.

As shown in the flow sheet means are provided for adding modifying agents to the standardized water coming from the last equalizer and going to the mashing apparatus.

The anhydrite equalizer may be run under some plus pressure and at a high temperature when there is an object in obtaining water containing less calcium sulphate than is normal to water at 100° C.

All the devices mentioned are kept hot. The hot effluent liquid leaving the anhydrite filter is standardized hard water of constant composition, whatever the nature of the original raw water. It can be sent, as indicated, directly to the mashing apparatus, after such modification in temperature as may be required by the particular mashing operation effected. With a malt mash, water at 100° C. is ordinarily mixed with cold malt; the mixture thereby acquiring a temperature of about 60° C. Mashing is conducted at some temperature between 60° and 70° C.; the particular temperature differing somewhat in different breweries. Frequently, mashing begins at 62° or 63° C. and ends at about 70° C. When mashing is done with an admixture of gelatinized corn grits, rice, etc., the temperature of the standardized water may be so adjusted as to produce in the malt mixture a temperature around 60° C.

The standardized water made as described is sufficient for good mashing. Where it is desired, for special reasons, to modify the standardized water in some respect, as by adjusting the pH a little to the acid side, by adding yeast nutrients, by adding a little more calcium sulfate than is normal to the standardized water, by adding magnesium sulfate, etc., these modifying agents can be delivered to the standardized water in known amounts from a special tank for storage of modifying agents. A known amount of liquid carrying the modifying agent joins the flow of standardized water prior to its delivery to the mashing apparatus, entering through a valved connection.

While I have spoken more specifically of beer, it is to be understood that the present mashing process is equally applicable in making the various other fermented beer-like beverages made from cereals; porter, ale, stout, etc.

Brewers in making beer often desire to use only malt, hops and water, in any case to make a beverage from water, malt and cereals only. In the case of pale beers, like "weissbier", some unmalted grain, rice, corn, etc., is often used. Addition of any foreign material to the brew is considered bad practice. No foreign material is used in the present invention, the minerals employed, gypsum and limestone, being those with which natural water comes into contact underground and to which it owes its hardness. Breweries sometimes use unduly hard water and with such a water, the present process effects a subtraction rather than an addition. It may be noted in this connection that these waters change in composition when heated, separating mineral matter which, according to heating conditions, may deposit as a sediment or as a scale or may go forward to the mash kettle as a turbidity. This is a frequent source of apparent fluctuations in the quality of a brewery water.

With these unduly hard waters, the mineral matter in the filters, calcium carbonate and calcium sulfate, either or both, builds up and the excess must be removed from time to time. This is particularly the case where lime is used to aid in removing $CO_2$, since new calcium carbonate is formed in the water; and where a feed of calcium carbonate or of calcium sulfate in aqueous suspension is used to reinforce the action of the filters.

It is good practice to use filters of ample size to permit a moderate velocity of flow in securing the necessary time of contact between liquid and solid. With most of the hard waters used in breweries, the charge in the marble or limestone filter builds up rather rapidly, while that in the gypsum filter diminishes. With an anhydrite filter in series, its charge builds up at the expense of the gypsum filter. The gypsum filter fouls with calcium carbonate after a time and should then be changed.

The filters may be run under pressure, may contain sand or gravel and may be provided with heating means. As stated, other means of securing intimate contact between the water and a granular or finely divided solid may be used, as the deaerator type of heater mentioned, or the "upflow softener" type of apparatus, in lieu of or in addition to filters; but since the standardized water delivered to the mash kettle should be clear and free of suspended matter, a filter in circuit is necessary at some point. Sand filters take up calcium carbonate or calcium sulfate, as the case may be, and then act as marble filters or gypsum filters.

While other temperatures between 60° and 100° C. may be used in the filter line, I regard 100° C. as a standard temperature. Maintenance of a high and fixed temperature is particularly desirable in the anhydrite filter, since it determines the calcium sulfate content of the standardized water.

Quick and thorough equalization of $CaSO_4$ content in compact apparatus may be secured by using a single anhydrite filter run under pressure at a temperature higher than 100° C. Fouling with $CaCO_3$ in the case of most hard waters and scaling difficulties render frequent renewals necessary.

Foul or impure waters are not ordinarily used as a brewery supply. Where they must be handled, they may be submitted to ordinary purifying treatments prior to the use of the present process.

In a specific embodiment of the present invention, I treat a hard, somewhat polluted, well water giving excellent but erratic results in mashing. As it comes from the well, it averages about 65 grains of $CaSO_4$ per gallon, or 1112 parts per million; and it is troublesome to handle because of deposition of scale. In heating the water for mashing, the excess of calcium sulfate is deposited; some as scale and some as turbidity. The total amount of calcium sulfate going forward to the mashing in solution and in suspension varies considerably. This water I standardize by passing through the described train of apparatus. It goes first to a shelf type deaerator heated by live steam and containing granulated white limestone. The effluent vapors and gases go to a preheater to recover the heat. The hot degasified water then goes through a series of filters, all closed to prevent entry of air and cooling by formation of vapor; first downward through a pervious bed of granulated dolomite, thence downward through a pervious bed of granulated native gypsum and thence downward through a pervious bed of granulated native anhydrite, emerging as a standardized hot brewing water. It is odorless and tasteless and is saturated with calcium sulfate; carrying 38 grains of $CaSO_4$ per gallon; an ample amount for securing good mashing. It deposits no scale and is of constant quality, day in and day out. In another specific embodiment of the present invention, a soft water from a granitic source, practically free from sulfates and not giving good worts, is sent through the same train of apparatus and emerges carrying the same amount of sulfates; about 38 grains of calcium sulfate per gallon. In mashing, the two standardized waters are practically indistinguishable; both give good worts with certainty and with a minimum of care and attention on the part of the brewmaster.

The original waters, though widely different give in this process the same type of effluent; what may be called a base type water for mashing. Where special waters are wanted, it is easy to qualify the base type water as desired. The amount of calcium sulfate in solution represents the solubility of anhydrous calcium sulfate at 100° C. Where, for any reason more calcium sulfate is wanted than the standard amount, a known amount of dihydrated or hemihydrated calcium sulfate may be added; both being more soluble.

What I claim is:

1. In brewing a fermented malt beverage from cereal materials and natural water with mashing to form a fermentable wort, the process of forming a uniform bright wort which comprises standardizing the raw water en route to the mashing operation by first heating it and removing the free $CO_2$ therefrom, by then exposing the hot water to intimate contact with a large surface area of calcium carbonate and by thereafter exposing the hot treated water successively to intimate contact with extensive areas of surfaces first of hydrated calcium sulfate and then of anhydrous calcium sulfate and thereafter mashing and sparging the cereal materials with the standardized water.

2. In the process of claim 1 aiding in the removal of $CO_2$ and producing extensive areas of calcium carbonate for the second treatment by adding CaO to the hot water in an amount less than corresponds to free $CO_2$ present in the hot water.

3. In the process of claim 1 securing extensive areas of surface of calcium carbonate and of calcium sulfate by passing the water successively through beds of granular calcium carbonate and of granular calcium sulfate.

4. In the process of claim 1 the improvement which comprises employing two calcium sulfate beds in series, the first containing a hydrated form of calcium sulfate and the second an anhydrous form of calcium sulfate.

5. In the process of claim 1 employing calcium carbonate and two calcium sulfate beds in series for treating the hot water, the improvement which comprises adding an aqueous suspension of calcium carbonate ahead of the calcium carbonate bed and an aqueous suspension of anhydrous calcium sulfate ahead of the calcium sulfate bed.

6. In brewing fermented beverages from cereal materials with a standardized hard water employed in mashing, a process of standardizing such water in calcium sulfate content which comprises bringing water heated to a temperature above 60° C. into intimate contact first with a hydrated form of calcium sulfate and then into similar intimate contact with an anhydrous form of calcium sulfate.

7. In standardizing hard water for brewing and other purposes, the process of reducing the calcium sulfate content of raw waters supersaturated as to hydrated calcium sulfate which comprises passing such water in a heated state into intimate contact with extensive surfaces of anhydrite.

8. In brewing fermented beverages from cereal materials and natural water, the process of standardizing water for mashing to produce clear worts which comprises boiling and degasifying the water for mashing, bringing the water to a calcium carbonate equilibrium with solid calcium carbonate, then bringing it to a calcium sulfate equilibrium by contact first with a hydrated form of solid calcium sulfate relatively more soluble in water and second with an anhydrous form of calcium sulfate less soluble in water and adding the hot treated water to the cereal material.

9. In brewing fermented malt beverages, a method of standardizing water in calcium sulfate content for making clear worts for fermentation which comprises heating the water for mashing, maintaining the hot water in contact with sufficient native anhydrite for a sufficient time to produce equilibrium between dissolved and undissolved $CaSO_4$ and mixing the standardized water with malt.

10. In the process of claim 9, maintaining a temperature of about 100° C. during the contact of water and anhydrite.

11. In the process of claim 9, maintaining a temperature materially above 100° C. and a superatmospheric pressure during the contact of water and anhydrite.

12. In standardizing hot hard water in calcium sulfate content for brewery purposes, a process which comprises supersaturating the hot water with hydrated calcium sulfate by intimately contacting it with a hydrated form of calcium sulfate and then removing the excess of dissolved calcium sulfate by contacting the hot supersaturated solution with crystallized anhydrous calcium sulfate.

K. P. McELROY.